3,150,435
PROCESS OF TEMPERING NYLON
Eugene M. McColm, Woodbridge, Conn., and Wesley Ferrell, Wayne, N.J., assignors to United States Rubber Company, New York, N.Y., a corporation of New Jersey
Filed Mar. 18, 1963, Ser. No. 266,778
13 Claims. (Cl. 28—76)

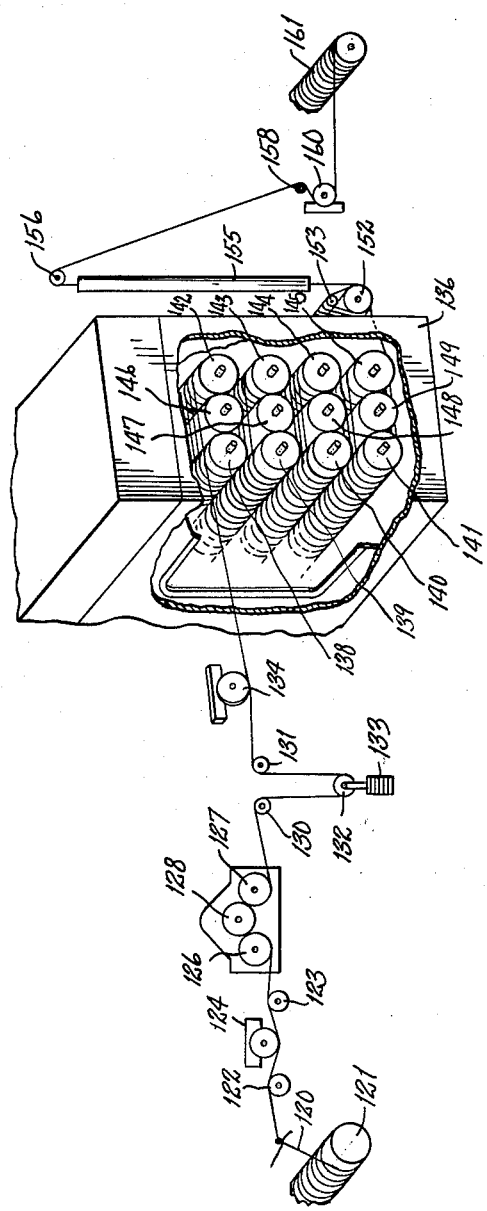

This application is a continuation-in-part of our previously filed copending application Serial Number 783,240, filed December 29, 1958, now abandoned.

This invention relates to a novel process for tempering nylon (polyamide) fibers so that they are thereby rendered more dimensionally stable and thus more useful in pneumatic tires.

Nylon is widely used in the manufacture of pneumatic tires. There are advantages in using nylon for this purpose, but also a number of drawbacks. Some of the notorious deficiencies of tires containing nylon cord are excessive growth and groove cracking, reduced tread wear and excessive flat spotting. It is believed that the deficiency in growth and groove cracking is due to an undesirably high creep rate, creep being defined as a long-time deformation or linear extension of the nylon cords under a static or dynamic stress or tension which is below the breaking strength of the cord.

Flat spotting occurs when any inflated tire is operated for a period of time and then allowed to come to rest. It occurs in rayon cord tires but is so slight as to be substantially unnoticeable, whereas in nylon cord tires it can be very significant. When a tire is run at high speed for an appreciable time, it becomes hot. If this tire is then brought to rest, the tension in those lengths of tire cord passing through the portion of the tire in contact with the ground (the footprint) is substantially reduced since the road actually carries part of the loading pressure of the tire. This reduction in tension causes these lengths of cord to retract or shorten by a mechanism which is substantially elastic and which therefore involves practically no retraction creep. Cords in other parts of the tire are not under this reduced tension and hence do not retract. If the tire is started turning again immediately, that is before it has had time to cool appreciably, no flat spot is observable, because when the tire begins to move the cords which were in the former footprint elongate elastically as much as they had retracted. If, however, the tire is allowed to cool appreciably before being started, these cords no longer elongate elastically as much as they had retracted, and the flat spot due to standing is therefore fixed or frozen into the tire. The flat spot causes the car to bump or vibrate when run, with consequent discomfort to the passengers. It is not permanent, but gradually disappears as the tire is run. "Run out" time or mileage is the time or distance that the car must be driven until the flat spot is no longer felt by a person sitting in the car. The phenomenon of flat spotting as above described recurs whenever the rotation of the tire is stopped for significant lengths of time.

Cure shrinkage is that retraction of the nylon cords or strands which occurs when it is subjected to tire curing conditions during the manufacturing process. Unless compensation is made for cure shrinkage, when the tire is removed from the mold while still hot it becomes distorted by the shrinking nylon cords. In conventional tires, such as those in which the nylon cords have been subjected to the hot-stretching process, it is always necessary to compensate for cure shrinkage by building the tire slightly larger than the mold size. The hot-stretching operation is supposed to effect a preliminary stretch of the nylon cords and thus minimize the occurrence of creep in tire use. The treatment involves subjecting the nylon to an elevated temperature under constant tension for a period of up to about 75 seconds, thereby causing the cord to elongate. Our analysis of the hot-stretch treatment reveals that tires built with cords so treated still show appreciable cure shrinkage, and leave much to be desired in regard to resistance to total growth and flat spotting. Our theoretical analysis reveals that in conventional hot stretching there is no significant change in the degree of order of the amorphous regions of the nylon cords, hence growth and flat spotting remain excessive. On the other hand, the process of this invention increases the degree of order of the molecules in the amorphous region and thus reduces growth and flat spotting significantly.

An object of this invention is to provide a tempering process for nylon (polyamide) strands and tire cords whereby the undesirable effects above-discussed are reduced substantially.

Another object of this invention is to provide a tempering process whereby nylon strand or cord is made which has a substantially reduced tendency to creep under stress conditions and is especially suitable for use in the construction of pneumatic tires which have a substantially reduced tendency to exhibit the annoying property of flat spotting.

A further object is to provide a process for tempering nylon strand or cord as a result of which said strand or cord has a substantially reduced shrinkage when subjected to tire curing conditions.

Other objects and advantages of our invention will become apparent from the following description and explanation thereof.

It is contemplated by the present invention to temper a nylon (polyamide) cord or strand or a web of a plurality of parallel cords or strands, under an initial tension, and at substantially constant length to a temperature of about 7° F. above to 80° F. below the melting point under ambient conditions, for a period of at least 30 seconds and under conditions such that the nylon is substantially unoxidized.

The term "nylon" is now widely adopted to describe any polyamide, that is the product of the condensation polymerization of one or more monomer species involving the reaction of an amine group with a carboxylic acid group. Although the process of the invention may be practiced usefully on any nylon material, the greatest interest lies in applying it to the treatment of those nylon materials most widely used as tire cords. These are nylon 66, which is the commercial condensation polymer formed from starting materials which are predominantly hexamethylene diamine and adipic acid, and nylon 6, which is essentially polycaprolactam and is also known under the commercial names of Perlon and Caprolan. Other related polymers formed by the condensation polymerization of other diamines and dicarboxylic acids or mixtures of one or both of these components or other lactams or of monomer molecules containing at least one amine group and at least one carboxylic group per molecule, or of mixtures of several or all of these types of reactants also form nylon materials which can benefit from the process of this invention. The nylons which are useful in the manufacture of tire cords generally have a molecular weight in the range of 10,000 to 25,000.

Pneumatic tires are generally made of a cord fabric wherein the individual cords are each composed of two or more strands twisted together, each strand having a denier of 800 to 2,000. The individual strands are generally each an essentially untwisted bundle of nylon filaments. When two or more of these strands are twisted together to form a tire cord, the resultant cord usually has a denier greater than the sum of the deniers of the component strands because the twisting operation results in their being shortened. Since denier is a measure of weight per unit length, any procedure which shortens the strand will increase the denier. The cords are then generally fashioned into a web, which is a fabric of parallelly aligned cords with only a small number of very light picks, just sufficient to maintain the integrity of the fabric. This web is then used in the construction of pneumatic tire carcasses. The tempering process of this invention may be performed upon the strands, the twisted cords, or the web of cords with equal success, although it may be most convenient on a commercial scale to subject a web of cords to the process.

An essential feature of this process is that the nylon strands be tempered at constant length. This could be accomplished by restraining the ends of a taut strand during the treatment, but for purposes of continuous processing, the same result can be achieved by passing the strands, cords or web through the treating zone over a series of rollers maintained at fixed distances apart from each other and each turning at the same peripheral speed as the others, the strands, cords or web passing sufficiently tightly about said rollers so that no slippage occurs between the material being treated and the roller surfaces. During the tempering process, the strands have a tendency to retract, i.e. to undergo a change in length. It is essential to this process not to permit such shrinkage but to temper the nylon at constant length, if a creep-resistant nylon with a reduced tendency to form flat spots in tires is to result. A multitude of other processes for heat-treating nylon strands under constant tension (i.e. under variable length) are known, but these do not have the beneficial effect on flat spotting and cure shrinkage mentioned hereinabove for the product made by the tempering process of this invention.

Another essential feature of this invention is that the strands or cords or web being treated be maintained at this constant length under an initial tension, that is that the untreated material be extended to the constant length at which it is treated by the application of a tensile force. This force may be sufficiently large to produce a tension just short of the breaking stress or ultimate strength of the strands at the tempering temperature. However, it is preferred that this initial tension be of a magnitude of about ½ to 3 grams per denier.

The best temperature at which to conduct this tempering process is dependent up on the specific nylon material to be treated. It is useful to characterize the tempering temperature for any particular nylon as a function of the melting point as determined on a sample of that nylon in the unstressed state. This melting point determination done under conditions of no stress and atmospheric pressure is referred to as the melting point under ambient conditions. Inasmuch as the melting point of polymeric materials such as nylon changes with the application of stresses to the material, it is possible to have a nylon strand under tension at a temperature above the melting point of that nylon as determined under ambient conditions. The desirable range of temperatures for tempering any particular nylon is from about 80° F. below the melting point under ambient conditions to about 7° F. above the melting point under ambient conditions. Nylon 6 has a melting point of about 420° F. Nylon 66 has a melting point of about 495° F. An over-all desirable temperature range for tempering nylon for tire cords is from about 340° F. to 500° F. Inasmuch as changes in temperature within any of the ranges expressed above is not highly critical to the results of the tempering process, a suitable temperature for treating nylon 66 can be stated to be approximately 460° F., that is to say 460° F. plus or minus about 30° F. The tempering temperature may be imposed upon the material being treated by virtue of heating the rolls over which the strands or cords or web are passed, by space heaters suitably disposed within the tempering zone, or, in the case where a superheated steam atmosphere is provided for the tempering process, by the heat content of this superheated steam.

It is important to the success of the tempering process that the nylon remain substantially unoxidized by the tempering treatment. This can best be accomplished by conducting the process in the absence of oxygen, although the presence of oxygen can be tolerated if the nylon has been previously protected by the presence of a suitable anti-oxidant. Those skilled in the art will recognize a wide variety of anti-oxidants that can be relied upon to protect nylon under the conditions of this tempering treatment. However, it is preferable to insure that the nylon remain substantially unoxidized by conducting the process in the absence of oxygen by providing an inert atmosphere for the process. This inert atmosphere is readily provided by any of the well known inert gases, such as nitrogen, or by conducting the tempering process in an atmosphere of steam, especially superheated steam. The conduct of the tempering process, especially where it is to be of a continuous nature, would be considerably complicated if it were to take place at pressures more than slightly in excess of atmospheric pressure. It will be seen from the description below of a procedure whereby this process may be practiced involving the continuous passage of nylon strand over a series of rollers that complicated pressure seals through which the yarn could be passed into and out of the treating chamber would have to be provided to conduct this process at more than a few inches of water of gauge pressure. Thus the superheated stem which it is desirable to use as the atmosphere for this process should be at substantially atmospheric pressure, that is no more than a few inches of water above or below atmospheric pressure, and at the temperature which has been selected by the criteria described above as the temperature for the process.

Another important condition of the tempering process is the time interval at which the strands or cords or web of nylon is maintained at substantially constant length under the temperature and atmosphere conditions of the process. Although extending the period of the treatment indefinitely is not detrimental, it is obviously uneconomical to do so. In fact, negligible additional benefit is derived from continuing the treatment beyond a period of about 30 minutes. Treatment periods from about 7 to 30 minutes have given good results. Especially where the process is conducted in an atmosphere of superheated steam, shorter treatment periods are found desirable. Thus tempering of nylon strands or cords or web in a superheated steam atmosphere for periods of 3 to 7 minutes were found to give particularly excellent results, and treatment periods of as short as 30 seconds are beneficial and within the scope of this invention.

As long as the conditions defined above for the tempering process of this invention are met, the apparatus in which the process is performed is of secondary importance. A single length of nylon strand or cord or web may be treated by restraining its ends and subjecting it to the tempering conditions. However, for commercial purposes it becomes important to treat the nylon continuously. Such an apparatus, suitable for continuously tempering nylon cords or strands by the process of this invention, is illustrated by the figure and described below. The description is for the tempering of nylon cord, but it will be understood that nylon strand would be tempered identically in the machine. Web could be treated in a similar machine, modified by substituting smooth rollers with hold-back devices for the rollers in the illustrated machine.

The figure is a schematic representation of a yarn tempering apparatus.

Untreated nylon cord 120 mounted on a roll 121 is subjected to initial tension by the steps consisting of first measuring the length in an unstretched state, next stretching the cord in an unheated condition, and then measuring the length of the cold stretched cord. In the next phase, the cord is tempered or heated at constant length and then cooled. Then the length is measured again. The measurement of the cold unstretched cord is accomplished by passing the cord over the top of two rollers 122 and 123 with a footage counter 124 pressing down against the cord 120 in an intermediate position. The cord is then passed through the hold-back device, which consists of two horizontally spaced rolls 126 and 127 and an upper roll 128 supported thereon. The upper roll 128 is mounted on a floating bearing (not shown) and is thereby able to roll on the surfaces of rolls 126 and 127. The upper roll 128 has a rubber coated surface, whereas the surfaces of rolls 126 and 127 are made of steel. Rolls 126, 127 and 128 are driven by suitable drive means (not shown). The cord is passed under the first roll 126, over the top of upper roll 128 and then under roll 127. Tension is applied to the cord by means of a floating weight after it has passed through the hold-back rolls. This result is achieved by means of two horizontally spaced fixed rollers 130 and 131 and a floating pulley 132, carrying a weight 133, suspended therebetween on the cord 120. The pulley 132 and weight 133 are kept in a suspended position by microswitches (not shown) contacting the weight carriage as it rises and falls. These switches vary the speed of rolls 126, 127 and 128 to maintain pulley 132 at the desired position. The footage of cold stretched cord 120 is then measured by counter 134.

The cold, stretched cord 120 is passed into tempering box 136. This box 136 contains four horizontally stacked tiers of three steel rolls each. Each tier of three rolls contains two outside ring-grooved rolls, 138–145, and a middle, smooth-surfaced bearing roll, 146–149. Only the outside rolls 138–145 contact the cord 120. The middle rolls 146–149 act as load-carrying surfaces to prevent distortion of the outer rolls 138–145 from the tension developed by having the cord wrapped around the respective rolls. Each of the outer rolls 138–145 contains 200 circumferential grooves along its length. The two outer rolls in each tier are arranged such that the grooves of one roll are intermediate the grooves of the other. By this arrangement the cord is advanced one grove by each successive wrap. Thus when the rolls are rotated the cord slowly advances from one end of a tier to the other and then down to the next tier, etc., until it leaves the tempering box 136. The rolls are turned at the same surface speed so that the cord 120 is at constant length throughout the tempering treatment. The outer rolls 138–145 are heated internally by means of hot oil, which is maintained at the desired temperature. The rolls are of such size and arrangement as to provide a hold-up of 1746 feet of cord.

The cord 120, leaving the box 136, revolves around an enclosed capstan consisting of two grooved rolls 152 and 153, one driven and the other an idler. The enclosure for the capstan (not shown) accommodates saturated steam at a slight pressure to provide a temperature of about 212° F. The purpose of treating with cooler steam is to lower the cord temperature before it is exposed to air. Air causes oxidation of the hot cord with consequent loss of tensile strength.

In the next step, the cord is passed through a vertical electrically heated tubular element 155 wherein the cord is dried. The cord leaves the heater 155 at the top, passes over roller 156, roller 158 and through footage counter 160. Finally, the cord is wound on take-up roll 161.

This apparatus is designed so that no stretch or shrinkage of the cord can occur between rolls 138 and 152, thereby insuring a constant length of cord within the tempering box 136. Any stretch or shrinkage resulting from cooling and tension release will occur between rolls 152 and 161.

The efficacy of the process of this invention, that is the degree to which the above-discussed properties of nylon strand or cord or web are improved by the process, has been measured in two different ways. Several samples of nylon tire cord treated by the process of the invention were tested on the apparatus described in U.S. Patent 3,062,044. In Table I, below, the following properties measured by the technique described in U.S. Patent 3,062,044, are tabulated for four different nylon tire cords: Percent Cure Shrinkage, Room Temperature to 350° F.; Percent Total Growth; Initial Depth of Flat Spot; and Depth of Flat Spot after 10 Minutes' Run-out at Room Temperature.

The cord in Example 1 is a commercially available *untreated* nylon tire cord, its properties being evaluated and tabulated below for comparison purposes.

The cord in Example 2 is the same type of commercial nylon tire cord treated by the prior art commercial hot-stretching (non-constant length) process described hereinabove. Its properties are also evaluated and tabulated below for comparison purposes.

The cord in Example 3 is a sample of the same type of commercial nylon tire cord that was treated by the process of this invention in the following manner: In order to assure that the cord remain substantially unoxidized, it was first treated with the commercially available anti-oxidant Thermoflex A, which is a mixture of 50% phenyl-2-naphthylamine, 25% N,N'-di-phenyl-p-phenylene diamine and 25% 4,4'-dimethoxydiphenylamine. The cord was then treated by the process of this invention in the apparatus described hereinabove and illustrated in the figure. After being subjected to an initial tension of 1.3 grams per denier it was treated in the apparatus at constant length and 470° F. for a period of 22 minutes. The atmosphere in the treating chamber was air.

In Example 4, a similar commercially available nylon tire cord was also treated by the process of this invention, but under different conditions. The cord (this time without prior treatment with an anti-oxidant) was passed through the apparatus illustrated in the figure under an initial tension of 1.8 grams per denier, and held at constant length for 22 minutes at a temperature of 470° F. in an atmosphere of superheated steam at atmospheric pressure. The steam was introduced to the treating chamber at 415° F.

*Table I*

|  | Example 1 | Example 2 | Example 3 | Example 4 |
| --- | --- | --- | --- | --- |
| Percent Cure Shrinkage, Room Temp. to 350° F | 4.81 | 3.74 | 2.23 | 2.36 |
| Percent Total Growth | 5.74 | 5.36 | 3.70 | 3.36 |
| Initial Depth of Flat Spot | 1.51 | 1.52 | 1.26 | 1.10 |
| Depth of Flat Spot after 10 Minutes' Run-out at Room Temp | 0.47 | 0.61 | 0.39 | 0.33 |

In addition to evaluating the properties of single nylon cord samples on the apparatus of U.S. Patent 3,062,044, it has been found desirable to measure the flat spotting tendencies of tire cords after these cords have been used in the construction of a pneumatic tire. To this end the following test facility is used: A 4-foot steel wheel is mounted with its axis horizontal below the testing floor in such a manner that the uppermost point of the rim protrudes just slightly through a hole in the test floor. The rim of this steel wheel is flat and 18 inches wide. A 7½ horsepower D.C. motor drives this wheel at any desirable peripheral speed from 0 to about 90 miles per hour.

An automobile is placed on the test floor in such a manner that its left front tire rests directly on the protruding surface of the steel wheel. The front left wheel of the car can thus be rotated at the same peripheral speed as the sunken steel wheel without moving the automobile. A small flat horizontal shelf, about 1.5 inches square and ½ inch thick is affixed to the spindle of this left front car wheel to protrude from it. Below this shelf a short steel post is mounted on the test floor. A short vertical metal arm, the upper end of which is held continuously against the underside of the metal shelf by a spring, is affixed at its lower end to the movable portion of a linear potentiometer, which in turn is mounted on the steel post and powered by a suitable power supply.

As a result, when the tire rotates, any out-of-roundness in the tire causes the hub and spindle to move up and down rapidly in a movement which is commonly called "wheel hop." Because of the spring tension, the vertical metal arm continuously follows this up and down movement and the output voltage of the potentiometer is a function of the instantaneous vertical location of the wheel hub.

The electrical signal from the potentiometer is connected into one channel of a chart recorder in such a way that as the hub and arm move upwards a given distance the recorder needle will move a given distance in one direction; and as the hub and arm move downwards a given distance the needle will move a given distance in the opposite direction. By suitable calibration the magnitude of the movement of the needle as recorded on the chart can be converted into the magnitude of the vertical motion of the car wheel hub as the wheel and tire are rotated. Thus as the chart moves through the recorder the needle traces the wave form of the hub movement.

By this method it is possible to measure the magnitude and wave form of the up and down movement of the car wheel caused by certain types of imperfections in the tire, as the wheel rotates.

Furthermore, an accelerometer is mounted vertically on the edge of the left front door of the car at a height corresponding approximately to that of the ear of a person sitting in the driver's seat. This accelerometer is connected to a power source, and its voltage output is a measure of the vertical acceleration at the door. The electrical signal from this accelerometer actuates a pen on another channel of the recorder so that as the front wheel rotates this pen traces a record of the changes in vertical acceleration at the door, due to disturbances in the car body caused by the wheel hop. Calibration permits conversion of the magnitude of the pen movement into acceleration in G's. Here again a wave form is traced as the tire rotates, and the chart is passed through the recorder. It has been found that the amplitude of this wave form is closely correlated with, and is therefore a measure of, what the passenger in the front seat of a car feels as an imperfectly round tire of the car is rotated.

It has also been found that as a car wheel and tire assembly is gradually speeded up, the amplitude of the wheel hop and of the vertical acceleration at the door will pass through maxima and minima which always occur at exactly the same speed for a given car and weight of tire. These maxima represent the wheel hop resonance points. Since wheel hop amplitude varies as the square root of the weight of the entire wheel and tire assembly, small changes in tire weight, as by changing tire sizes, say, from 7.50 inches to 8.50 inches, cause only negligible changes in the location of the wheel hop resonance points.

To test the tendency of a tire to form flat spots, the tire is run at a fixed high speed of about 65 miles per hour for exactly one hour to heat it up, then is stopped to allow the flat spot to form for exactly 90 minutes. During this time the ambient temperature is maintained constant at 75±3° F., in order to permit uniform cooling. Moreover the ambient air is circulated through the pit containing the sunken wheel so that the temperature conditions of the surface on which the tire is flat spotted are constant from test to test.

After the 90-minute flat spotting period, the sunken wheel is started up at such a speed that the tire rotates at approximately 15 r.p.m. At this speed no vertical acceleration at the door greater than 0.005 G is noticed. The vertical hub movement, however, is actually a plot of the variation in the rolling radius of the tire. The hub will drop, then rise as the flat spot passes through the area of contact with the sunken wheel. The magnitude of this drop on the fourth revolution is defined as the measure of the initial depth of the flat spot. The depth decreases rapidly during the first two or three revolutions so that the fourth is considered to be the earliest at which a reasonably error-free measurement can be made.

After five revolutions the tire and wheel are accelerated to a peripheral speed of 28.35 miles per hour, one of the wheel hop resonance peaks for the particular car we have used. The chart is run as soon as this speed is reached and again at 0.5 mile, 1.0 mile, and every mile thereafter for 15 miles, in order to get a measure of the rate of decay of the flat spot.

The amplitudes of the wheel hop displacement, expressed in miles, and of the vertical acceleration at the door, expressed in G's, are then plotted against miles run. From these curves the miles required for these amplitudes to decrease to 60 miles and 0.05 G, respectively, are then taken as measures of the rate of flat spot decay. These values of the respective measurements reflect approximately the magnitudes of the disturbances caused by imperfections in the road which a passenger feels on a reasonably smooth black-top road when riding in a conventional moderately-priced automobile. Disturbances below this level caused by tire imperfections would merge with those caused by the road and could not be distinguished therefrom, so that when these levels of flat spot are reached on such a road the passenger would consider that the flat spot has disappeared. (The reason why flat spots are not felt in rayon tires is that these tires usually develop flat spots of only about this order of magnitude or only slightly greater.)

A number of samples of nylon 66, 840 denier, two-ply tire cord were treated by the process of the invention and then used in the construction of conventional, four-ply pneumatic automobile tires. The tires were mounted on the left front wheel of the automobile used in the test procedure described immediately above. The results are tabulated in Table II below.

Example 5 shows the test results of a tire built with nylon cord treated by the conventional prior art hot-stretching process. The results are tabulated for comparison purposes.

In Example 6, a similar nylon 66 tire cord was tempered by the process of this invention in the apparatus illustrated in the figure by subjecting it to an initial tension of 2.2 grams per denier, and then holding it at constant length for 3 minutes in an atmosphere of super-heated steam at 460° F. under a pressure of approximately ¼ to ½ p.s.i.g.

The cord in Example 7 was treated identically to that in Example 6, except that the treatment involved holding it at constant length for a period of 7 minutes.

In Example 8, the same type of nylon 66 tire cord was subjected to an initial tension of 1.2 grams per denier and held at constant length for 3 minutes in an atmosphere of superheated steam at 460° F. at a pressure of about ¼ to ½ p.s.i.g.

In Example 9 the same type of nylon cord was tempered by subjecting it to an initial tension of 2.2 grams per denier and holding it at constant length for a period of 7 minutes in an atmosphere of superheated steam at 400° F. and a pressure of ¼ to ½ p.s.i.g.

In Example 10, the treatment was identical to that in Example 9, except that the process was conducted at a temperature of 480° F.

In Example 11, the nylon 66 tire cord was subjected to an initial tension of 1.2 grams per denier and held at constant length for 7 minutes in an atmosphere of super-heated steam at 460° F. and at a pressure of ¼ to ½ p.s.i.g.

The treatment in Example 12 was identical to that in Example 11, except that the nylon tire cord was subjected to an intial tension of 2.6 grams per denier.

Table II

| Example | Initial Depth of Flat Spot on 4th Revolution, Mils | Miles Required to Reach | |
|---|---|---|---|
| | | Vertical Acceleration at Door of 0.05 G | Wheel Hop Amplitude of 60 Mils |
| 5 | 195.7 | 7.9 | 5.7 |
| 6 | 179.2 | 2.6 | 2.8 |
| 7 | 164.2 | 1.6 | 1.7 |
| 8 | 154.6 | (¹) | 1.5 |
| 9 | 173.5 | 2.6 | 2.8 |
| 10 | 175.3 | 2.7 | 2.9 |
| 11 | 180.4 | 3.3 | 3.8 |
| 12 | 184.3 | 5.9 | 4.9 |

¹ Not recorded.

Example 13: Nylon 66 tire cord of the same type as that used in Examples 6 through 12 above was tempered by the process of this invention by subjecting it to an initial tension of 2.2 grams per denier and holding at constant length for a period of 7 minutes in an atmosphere of superheated steam at 460° F. and at a pressure of ¼ to ½ p.s.i.g. in the apparatus illustrated in the figure. The cord thus tempered was used to construct a standard four-ply automobile tire. This tire after being tested on the above-described test automobile was stored for a period of 29 days in a chamber in which the atmosphere was maintained at 75° F. and 100% relative humidity. At the end of this period the tire was again tested by the same method. It was found that the tire made with nylon cord tempered according to this invention benefited by this storage at high humidity in undergoing a reduction in the initial depth of flat spot on the fourth revolution from 153.3 mils before the moist storage to 118.4 mils after storage; in undergoing a reduction in the miles required to reach a vertical acceleration at the door of 0.05 G of 2.8 miles before the moist storage to 1.7 miles after storage; and in undergoing a reduction in the number of miles required to reach a wheel hop amplitude of 60 mils from 1.75 miles before moist storage to 1.5 miles after storage.

Tires built from nylon tire cord tempered by the process of this invention were also tested for road stability and steering response. In determining stability, a test car on which the tires were mounted was driven at speeds of 65 to 70 miles per hour along a narrow twisting road. The general performance of the car, including the necessity to over-correct in coming out of turns in order to neutralize the sway of the back end of the car, provided a test for stability. Tires containing nylon cord tempered in an air atmosphere were of significantly better stability than the conventional tires containing hot-stretched nylon cords. Tires containing nylon cords tempered in a superheated steam atmosphere showed even better stability.

Response is measured by driving a car down a straight road at a speed of 70 miles per hour and zig-zagging back and forth across the road. The rate with which the tire follows the rim is termed the response or cornering ability. Tires containing nylon cord tempered by the process of this invention in an air atmosphere were significantly better in response than tires built with hot-stretched cords, whereas the tires containing nylon cord tempered in an atmosphere of superheated steam were better still. Tempered cord tires exhibited less noticeable flat spots than the hot-stretched cord tires, and a much faster rate of run-out of the flat spot, with the steam-tempered cord tires being best in each case.

Having thus described our invention, what we desire to claim and protect by Letters Patent is:

1. A tempering process which comprises subjecting a nylon strand to an initial tension, and while at substantially constant length heating said strand to a temperature of about 7° F. above to 80° F. below the melting point of the nylon under ambient conditions, for a period of at least about 30 seconds and under conditions such that the nylon is substantially unoxidized.

2. A tempering process which comprises subjecting a nylon strand under an initial tension of about ½ to 3 gm./denier and at substantially constant length to a temperature of about 7° F. above to 80° F. below the melting point of the nylon under ambient conditions, for a period of about 30 seconds to 30 minutes, and in the absence of oxygen.

3. A tempering process which comprises subjecting a nylon strand under an initial tension of about ½ to 3 gm./denier and at substantially constant length to a temperature of about 7° F. above to 80° F. below the melting point of the nylon under ambient conditions, for a period of about 30 seconds to 30 minutes, and in an atmosphere of superheated steam.

4. A tempering process which comprises subjecting a nylon strand to an initial tension, and while at substantially constant length heating said strand to a temperature of about 7° F. above to 80° F. below the melting point of the nylon under ambient conditions, for a period of at least about 7 minutes and under conditions such that the nylon is substantially unoxidized.

5. A tempering process which comprises subjecting a nylon strand to an initial tension, and while at substantially constant length heating said strand to a temperature of about 7° F. above to 80° F. below the melting point of the nylon under ambient conditions, for a period of at least about 7 minutes and in the absence of oxygen.

6. A tempering process which comprises subjecting a nylon strand under an initial tension of about ½ to 3 gm./denier and at substantially constant length to a temperature of about 7° F. above to 80° F. below the melting point of the nylon under ambient conditions, for a period of about 7 to 30 minutes, and under conditions such that the nylon remains substantially unoxidized.

7. The process of claim 4 wherein the treatment is conducted in an atmosphere of superheated steam.

8. The process of claim 6 wherein the treatment is conducted in an atmosphere of superheated steam.

9. The process of claim 4 wherein said nylon strand is composed of nylon 66.

10. The process of claim 4 wherein said nylon strand is composed of nylon 6.

11. A tempering process which comprises subjecting a nylon strand under an initial tension of about ½ to 3 gm./denier and at substantially constant length to a temperature of about 7° F. above to 80° F. below the melting point of the nylon under ambient conditions, for a period of about 3 to 7 minutes, and in an atmosphere of superheated steam.

12. A tempering process comprising subjecting a nylon strand to an initial tension of about ½ to 3 gm./denier and then holding said strand at substantially constant length in an atmosphere of steam at essentially atmospheric pressure and superheated to a temperature of 340° F. to 500° F. for 3 to 7 minutes.

13. The process of tempering nylon 66 tire cord comprising maintaining said cord under an initial tension of 1.2 to 2.6 gm./denier at substantially constant length in essentially atmospheric steam superheated to approximately 460° F. for about 3 minutes.

References Cited in the file of this patent

UNITED STATES PATENTS

| | | |
|---|---|---|
| 2,226,529 | Austin | Dec. 31, 1940 |
| 2,365,931 | Benger | Dec. 26, 1944 |
| 2,509,741 | Miles | May 30, 1950 |
| 2,670,267 | Bredeson | Feb. 23, 1954 |
| 2,807,863 | Schenker | Oct. 1, 1957 |
| 2,880,057 | Cuculo | Mar. 31, 1959 |
| 2,926,065 | Coplan et al. | Feb. 23, 1960 |
| 2,956,330 | Pitzl | Oct. 18, 1960 |

FOREIGN PATENTS

| | | |
|---|---|---|
| 691,370 | Great Britain | May 13, 1953 |